United States Patent [19]

Branden et al.

[11] 4,277,652
[45] Jul. 7, 1981

[54] FASTENING ARRANGEMENT IN A TELEPHONE INSTRUMENT

[75] Inventors: Leif Branden; Jan F. Bruun; Olle Holm, all of Tyresö; Ronnie E. Mellgren, Enskede; Karl A. Ryr, Tyresö; Carl-Axel Strömer, Bromma; Erling Tronslien, Tyresö, all of Sweden

[73] Assignee: Telefonaktiebolaget L M Ericsson, Stockholm, Sweden

[21] Appl. No.: 50,171

[22] PCT Filed: May 31, 1979

[86] PCT No.: PCT/SE78/00061

§ 371 Date: Jun. 24, 1979

§ 102(e) Date: May 31, 1979

[87] PCT Pub. No.: WO79/00227

PCT Pub. Date: May 3, 1979

[30] Foreign Application Priority Data

Oct. 24, 1977 [SE] Sweden ........................ 7711945

[51] Int. Cl.³ ............................................. H04M 1/02
[52] U.S. Cl. .................................. 179/100 D; 179/179
[58] Field of Search ........... 179/100 D, 100 R, 100 L, 179/103, 178, 179; 361/395, 399, 415

[56] References Cited

U.S. PATENT DOCUMENTS

| 3,126,454 | 3/1964 | Fresk et al. ............... 179/100 D |
| 3,657,487 | 4/1972 | Schwanck et al. ......... 179/100 D |
| 4,089,042 | 5/1978 | Torburn ....................... 361/399 |

FOREIGN PATENT DOCUMENTS

| 1146123 | 9/1961 | Fed. Rep. of Germany ...... 179/100 D |
| 2736545 | 2/1979 | Fed. Rep. of Germany .......... 361/399 |

Primary Examiner—John H. Wolff
Assistant Examiner—Randall P. Myers
Attorney, Agent, or Firm—Hane, Roberts, Spiecens & Cohen

[57] ABSTRACT

A fastening arrangement for one or more circuit cards in a telephone instrument having a housing comprising a base plate with walls around the perimeter of the housing extending substantially perpendicular to the base plate and a rear casing which has a planar surface extending perpendicular to the base plate and directed towards the front of the instrument. Supporting elements are mounted on the planar surface and have the form of projections with grooves to receive a circuit card. The front wall of the base plate carries supporting elements for the circuit cards.

9 Claims, 12 Drawing Figures

FASTENING ARRANGEMENT IN A TELEPHONE INSTRUMENT

FIELD OF INVENTION

The present invention relates to a fastening arrangement for one or more circuit cards in a telephone instrument of the kind whose housing, besides a plane base plate, consists of a two-part casing namely a rear and a front casing.

DESCRIPTION OF PRIOR ART

Telephone instruments have heretofore been constructed of a number of so called main components, such as the key set (or dial), transmission circuits, cradle assembly etc., which individually have been mounted in the instrument. The introduction of electronic circuits for pulsing and transmission purposes has caused the number of electronic components to increase considerably. However, the tendency in the future is for the electronic circuitry to be integrated on a large scale to cover several functions and for the electro-mechanical components of the instrument (key set, cradle assembly) to be made smaller. It is therefore natural to assemble as many components as possible on one or more circuit cards in order to more easily utilize the components for common functions. At the same time the production is rationalized.

The arrangement according to the invention is specially adapted for a so called two-part divided telephone instrument shown in the Swedish design No. 18310. In this instrument, the inclination of the key set is 15°–25° relative to the horizontal. This creates difficulties in mounting on the base plate a circuit card (or several), and the card (or cards) on which the key set, the cradle assembly, the key set electronic and the transmission circuit are mounted. Therefore the circuit card (or cards) is attached to the casing which, however, involves certain disadvantages in manufacturing and maintenance. The circuit card may also be placed on a rack, standing up from the base plate of the set. However, this involves higher costs than the above solution.

SUMMARY OF THE INVENTION

An object of the present invention is to provide a fastening arrangement for one or more circuit cards in a telephone instrument which allows for a flexible and space saving mounting of the electronic and electromechanical instrument components on the circuit cards.

BRIEF DESCRIPTION OF THE DRAWINGS

The invention will be described in greater detail with reference to the accompanying drawings, in which.

PREFERRED EMBODIMENTS

In the following, the fastening arrangement according to the invention is described in relation to a telephone instrument having a two-part casing, i.e. a front casing which is detachable and a rear casing forming part of the base plate of the instrument. Thus, FIGS. 1, 4, 8 and 10 show the interior of the instrument, the front casing being removed in order to clearly show the arrangement and its embodiments. The components of the instrument (the bell signal mechanism) which are not mounted on the circuit card have been excluded for better clarity.

Figure 1:
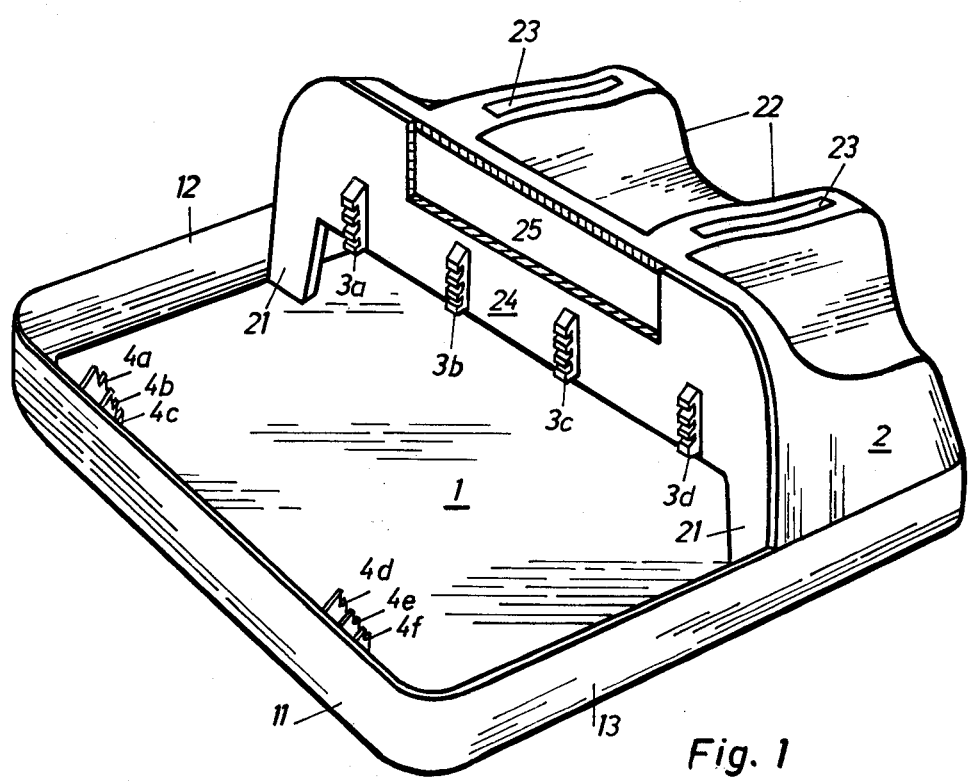
FIG. 1 shows a perspective view of the base plate and the rear casing of a telephone instrument, its front casing being removed to illustrate a basic embodiment of the arrangement according to the invention.

FIG. 1 shows a basic embodiment of the arrangement for securing one or more circuit cards. The base plate of the instrument is generally designated 1 and its rear casing 2. The base plate 1 is provided alongside its edges and around the instrument with upright walls of which the front wall 11 and the two side walls 12, 13 are visible in FIG. 1. The walls 11–13 have mainly the function of supporting the front casing which is not shown and the rear casing 2. The casing 2 is, in addition, fastened by screws to the base plate 1 by means of two legs 21. The rear casing 2 has furthermore two projections 22 which are intended adapted for enclosing the cradle of the instrument, each of the cradle arms in the mounted position protruding through a slot 23. The projections 22 are furthermore intended for carrying the hand set which is not shown. The casing 2 has one side part 24 in the form of a plane boundary surface which, in the mounted position of the rear casing, faces the instrument front and is directed mainly perpendicular to the bottom plate 1. The part 24 is preferably moulded in the same manufacturing operation, i.e. with the same pressing tool as the rear casing 2 and thus it forms an integral unit together therewith. A rectangular opening 25 alongside the side part 24 makes it possible to insert the cradle in position. In the case of a ready mounted instrument, this will cooperate with a cradle assembly mounted on a circuit card, which cradle assembly has an actuation arm arranged to be activated by the cradle by so-called indirect actuation.

According to the invention, for fastening one or more circuit cards, fastening elements are provided which are in the form of a number of projections 3a–3d placed on the side part 24 and a row in parallel to the plane of the base plate 1. The projections 3a–3d are preferably moulded in the same manufacturing operation as the side part 24 (and the rear casing 2) and will be described in more detail in connection with FIGS. 2 and 3. In order to fasten the circuit cards in the instrument, furthermore, a number of supporting devices 4a–4f are provided in close vicinity to and alongside the wall 11 which is standing upright from the bottom plate 1.

Figure 3:
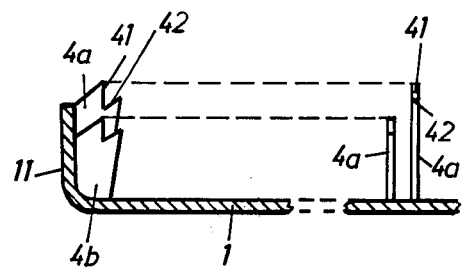
FIG. 3 is a sectional view showing in detail supporting abutment elements included in the arrangement according to the invention.

These will also be described in more detail in connection with FIG. 3.

Figure 2:
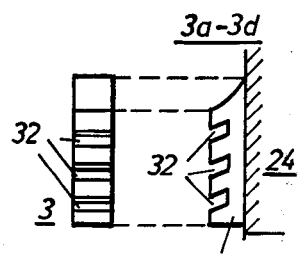
FIG. 2 shows in detail fastening elements included in the arrangement according to the invention.

FIG. 2 shows in detail one of the fastening elements 3. It consists of a frame part 31 provided with grooves 32 and the number of such grooves is equal to the number of cards of varying sizes which are to be fastened to the instrument. As is shown in FIG. 2, the top and lower boundary surfaces of each groove 32 form a certain acute angle with the plane of the base plate (which in the figure coincides with the horizontal). The grooves 32 of the different fastening arrangements 3a–3d of FIG. 1 are then positioned at the same level relative to the base plate 1 so that the lowest grooves of each projection 3a–3d together define a certain lowest level for a circuit card, the grooves of each projection positioned nearest above defining the next higher level and so on.

The two groups of supporting elements shown in FIG. 1 and situated next to the wall 11 also form abutment elements for the circuit cards. Each consists of a post, for example 4a, 4b as shown in FIG. 3. Each post is preferably arranged alongside one of the edge surfaces moulded to the inner side of the wall 11 in order to obtain good resistance to stress which is important when handling the instrument. One post, for instance 4a, comprises a point-shaped notch 41 one boundary surface 42 of which forms the same acute angle to the base plate as the two top and lower boundary surfaces of a groove 32 of the projections 3a–3d. The second boundary surface of the notch 41 substantially forms a right angle with the base plate 1. The mutual positions of the notches 42 of the supporting elements 4a, 4b in the vertical direction correspond to the mutual positions of the grooves 32 of some of the projections 3a–3d.

When a rectangular circuit card is fastened to the instrument, it is first inserted into the grooves 32 alongside one of the card edges and at the desired level. The card is then in such a position that its opposite edge contacts the peaks of the posts 4a, 4b. The last mentioned edge is "coded" according to which level the card will be placed on, that is it is provided with cut-outs whose positions alongside the edge determine the intended level. If the card is to be placed on the lowest level, the cut-outs on the card are so placed that the posts 4a, 4b, 4e fit through these cut-outs and the card abuts against the elements 4c, 4f. When the card has been pushed into the lowest groove of the projections 3a–3d, the posts 4c, 4f are forced by the finger to be bent somewhat in the direction away from the instrument front and the lower edge of the card is forced into the notches 42 of the posts 4c, 4f. This is made possible by the fact that the base plate 1 as well as the posts 4a–4f are made of an elastic synthetic material, whereby a certain spring action of the elements 4a–4f is obtained on fastening.

Certain embodiments of the fastening arrangement according to FIG. 1 will be described in more detail in connection with FIGS. 4, 8 and 10 and, at the same time, the function of the above mentioned "coding" of the circuit cards will appear in greater detail.

Figure 4:
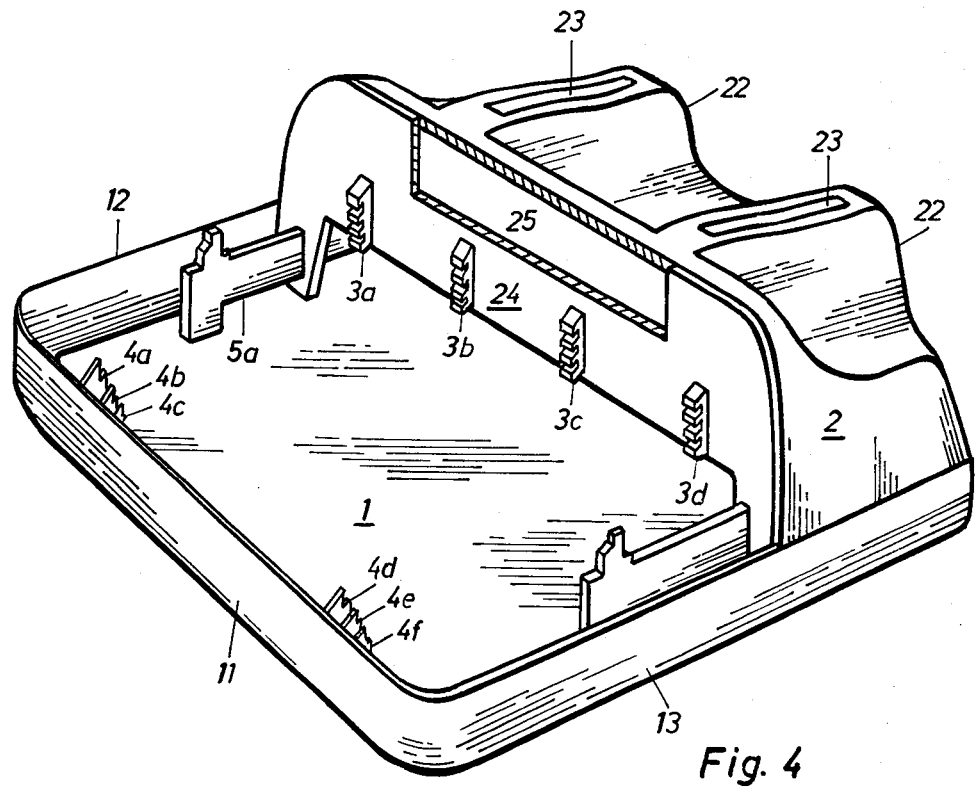
FIG. 4 shows a perspective view similar to FIG. 1 illustrating a first modification of the arrangement according to the invention.

FIG. 4 shows a first modification of the arrangement according to the invention. The projections 3a–3d and the supporting abutment elements 4a–4f are of the same design as in FIG. 1. In order to obtain a better supporting effect of the mounted cards, arms 5a, 5b have been moulded to the side part 24 of the rear casing according to the embodiment shown in FIG. 4, to the side surfaces of the two legs 21 but of course the arms can be placed in another suitable place alongside the side part 24, for instance between two projections 3a, 3b and 3c, 3d, respectively.

Figure 5:
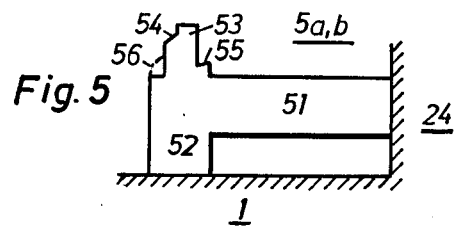
FIG. 5 shows in greater detail a supporting element included in the embodiment according to FIG. 4, FIGS. 6 and 7 each shows the outline of circuit cards which are kept in place in the instrument by means of the arrangement according to the invention.

The arms 5a, 5b consist of a part 51, which is disposed longitudinally relative to the walls 12, 13 and a connection part 52, the lower edge surface of which is moulded to the bottom plate 1. As best appears from FIG. 5, each arm 5a, 5b has a pillar-formed elevation 53 which, on each side, is formed with sloping edge surfaces 54, 55. When fastening a card, the edge surface 54 serves as a support for the card on the top level and the edge surface 55 supports the card on the lowest level. If there is a need for a support also for the card on the middle level, another sloped edge surface 56 can be formed on the elevation 53 as has been indicated with dotted lines in FIG. 5. It should be mentioned that FIGS. 4, 5 do not show the exact relative dimensions or the positions of the supporting surfaces 54, 55, 56 alongside the pillar-formed elevation 53 but only serve to illustrate the principle.

Figures 6, 7:
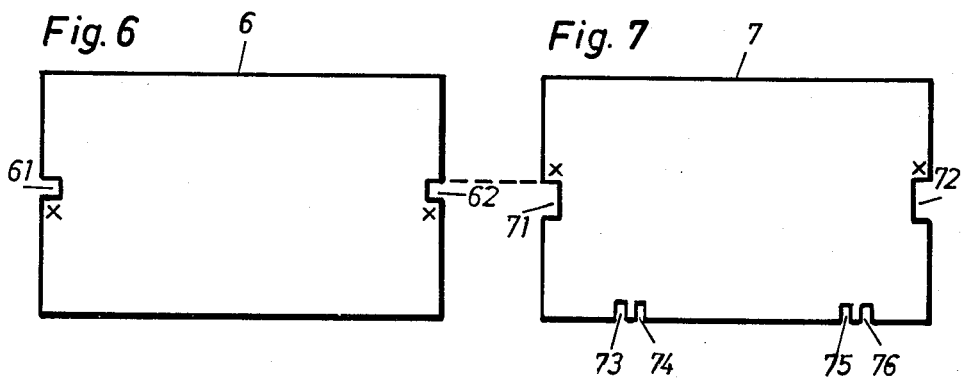

In FIGS. 6 and 7, the outline of two circuit cards is schematically shown which are to be fastened respectively on the top and the lowest levels in the fastening arrangement of the instrument. The card 6 has two cut-outs 61 and 62 each having dimensions corresponding to the cross-section of the top part of the pillar-formed elevation 53. On mounting, the card will extend freely along the vertical edge surfaces of the elevation and, when fastened, it will contact the surface 54, at the cross marking shown in FIG. 6. This surface is inclined at an acute angle relative to the plane of the base plate equal to the corresponding angle of the grooves 32 and 42.

The card which is to be arranged on the lowest level has an outline according to FIG. 7. The cut-outs 71 and 72, corresponding to the cut-outs 61, 62 of the card according to FIG. 6, are here somewhat broader in order to allow the card edge on fastening to slidingly pass the edge surface 54 and to contact the surface 55 at the cross marking in FIG. 7. Also this surface is inclined at an acute angle relative to the plane of the base plate equal to the above mentioned angle. Furthermore, the card 7 is provided alongside its lower edge with further cut-outs 73, 74 and 75, 76 in order to be able, on fastening, to pass the supporting abutment devices 4a, 4b and 4d, 4e, respectively. The positions of all cut-outs 71, 72, 73, 74 and 75 are of course chosen with reference to the position of the different elements 4a–4f and 5a, 5b of the fastening arrangement.

Figure 8:
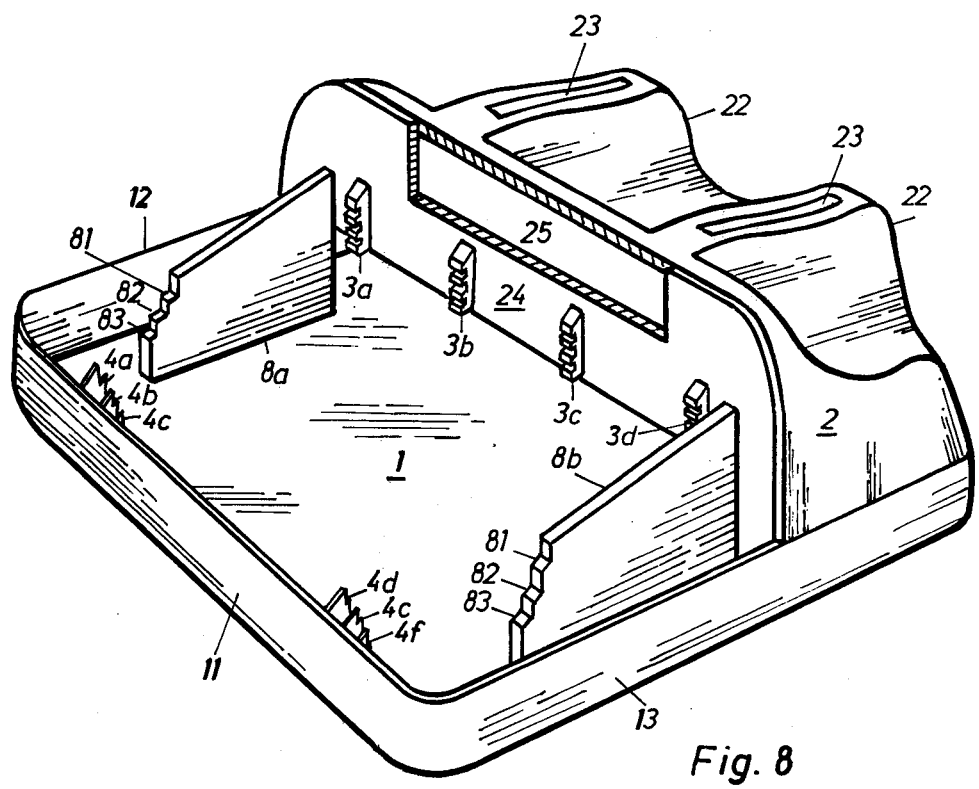
FIG. 8 shows a second modification of the arrangement according to the invention.
Figure 9:
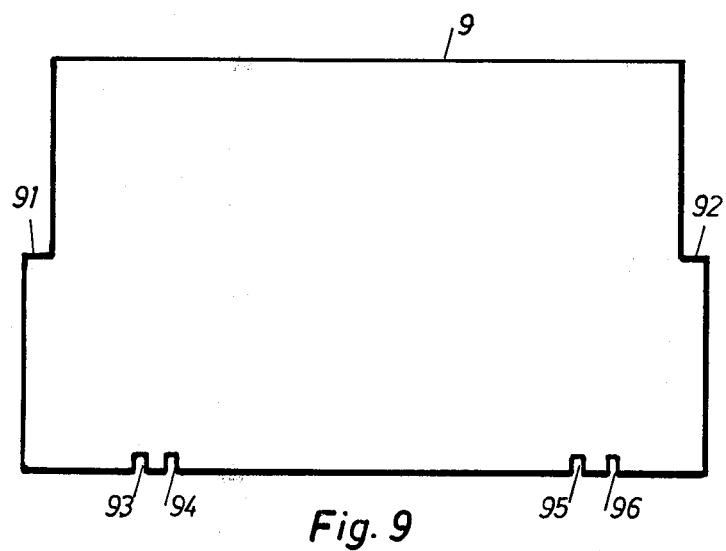
FIG. 9 shows the outline of a circuit card which is kept in place by means of the arrangement according to FIG. 8.

In the embodiment according to FIG. 8, the arms 5a, 5b according to FIG. 4 have been replaced by plate-formed parts 8a, 8b each having step-formed shelves 81, 82, 83 to support secured circuit cards. The plates 8a, 8b as well as the arms 5a, 5b are, according to FIG. 4, rigidly moulded to the side part 24 of the rear casing at a suitable distance from the walls 12 and 13 respectively. The fastening of circuit cards is, in principle, effectuated in the same manner as has been described above. The card on the lowest, the middle and the top levels is supported by the shelves 83, 82 and 81 respectively. FIG. 9 shows the outline of a card which is to be placed on the lowest level and, consequently, is provided with cut-outs 93, 94 and 95, 96 in order to let the supporting abutment devices 4a, 4b and 4d, 4e respectively pass therethrough. The positions of the boundary surfaces 91, 92 then correspond to the position of the shelf 83.

Figure 10:
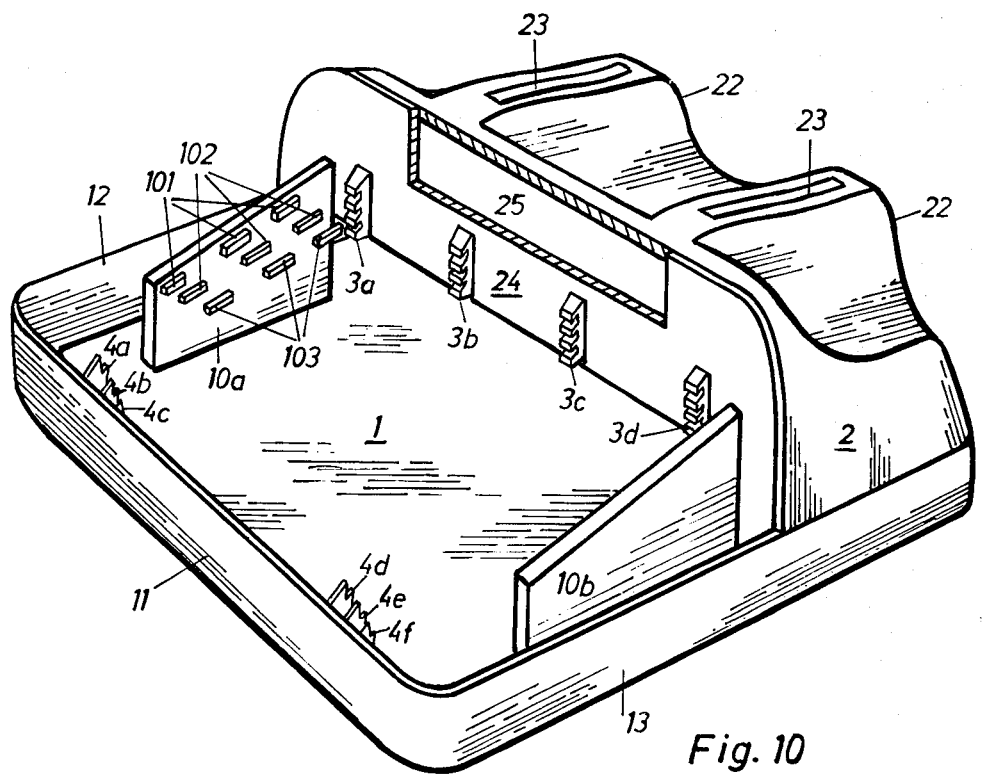
FIG. 10 shows a third modification of the arrangement according to the invention, and FIGS. 11 and 12 each shows the outline of circuit cards, which are kept in place by means of the arrangement according to FIG. 10.
Figure 11:
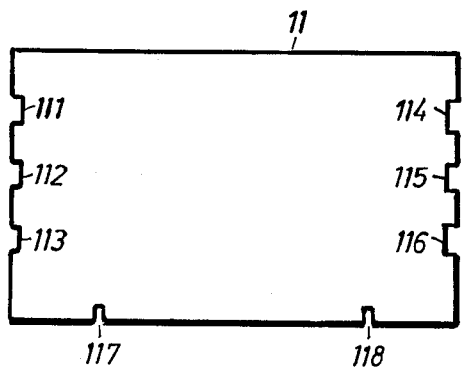
Figure 12:
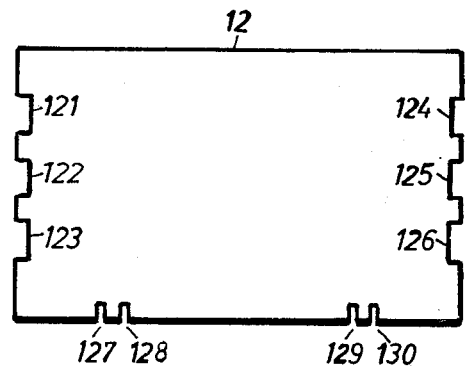

In the embodiment according to FIG. 10, as in the embodiment according to FIG. 8, two plate-formed parts 10a, 10b are rigidly moulded to the side part 24 of the rear casing. The supporting elements are formed by ribs 101, 102, 103 extending along the inside of each plate-formed part. The ribs 103 are then placed in the vertical direction so that they will support a circuit card on the lowest level, the ribs 102 will support cards on the middle level and the ribs 101 will support cards on the top level. FIGS. 11 and 12 show the outline of two circuit cards 11 and 12 which are be placed on the middle level and on the lowest level, respectively. The edges of the circuit cards, as already described, are "coded", i.e. provided with cut-outs 111–116 on the card 11 and cut-outs 121–126 on the card 12 the positions of which determine the level of the card in the instrument. As regards the card 11, it is important that the cut-outs 111–116 be placed and dimensioned so that the card only can pass the ribs 101, forming the supports for the top level, and be stopped by the ribs 102 which in a fastened position support the card. As already mentioned, the card 11 (and 12) is coded along the broader side with the cut-outs 117–118 which implies that the card 11 passes the supporting abutment elements 4a, 4d. The cut-outs 121–126 of the card 12 (FIG. 12) are somewhat broader than the corresponding cut-outs 111–116 of the card 11, since, when fastening, the ribs 102 are also to be passed, the card being supported by the ribs 103. The cut-outs 127, 128, 129, 130 let the card pass the supporting abutment elements 4a, 4b and 4d, 4e, respectively.

When a card is to be removed, the lower edge is lifted directly upwards from the bottom plate, its edge surface sliding along the vertical surfaces of respective supporting abutment element 4a–4f. At the same time the upper card edge is angularly adjusted in the groove of the projections 3a–3d. Therefore these are dimensioned somewhat broader than the thickness of one card. When the card has been lifted sufficiently so that its lower edge surface has passed the top part of the supporting abutment elements 4a, 4d, it is free to be removed from the groove of the projections 3a–3d.

Several modifications of the fastening elements 3a–3d, 4a–4f, and the supporting elements 5a–5b, 8a–8b, 10a–10 b are of course possible within the scope of the invention. The supporting elements of 5a–5b in FIG. 4, for example, can be arranged to stand by themselves, i.e. not be moulded to the side part and be in the shape of upright posts of a similar design as the connection part 52 (without the associated arm 51) with associated elevation 53 having sloping edge surfaces 54, 55. In a similar manner, the supporting elements 8a–8b, FIG. 8 and 10a–10b, FIG. 10 can also, of course, be arranged to stand by themselves on the bottom plate 1. The embodiments shown in FIGS. 4, 8 and 10 have the advantage that small tolerances between supporting elements and fastening elements can be achieved which is important for the dimensioning of the circuit cards and when cutting the cards. This is also important for the function of the acutation arm of the contact spring set, the position of which is determined by the position of the circuit card while the position of the contact spring set is determined by the design of the rear casing.

We claim:

1. A fastening arrangement for a number of circuit cards in a telephone instrument comprising a housing including a base plate provided with perimetral walls extending around the instrument substantially perpendicular to the base plate, a front casing, and a rear casing which has a planar side surface extending perpendicularly to the base plate, said planar side surface facing the front of the instrument and extending substantially along the entire width of said rear casing, supporting elements on said planar side surface for circuit cards, said supporting elements including projections extending parallel to said base plate, each of said projections being provided with a plurality of grooves extending at an angle towards the base plate, each groove having a width corresponding to the thickness of a circuit card, and combined abutment and supporting elements located on the wall of said base plate which is situated at the front of the instrument for supporting and holding circuit cards engaged in the grooves of said projections.

2. An arrangement according to claim 1 comprising an upright standing element on said base plate standing by itself away from said side surface and including further supporting elements for said circuit cards.

3. An arrangement according to claim 1 comprising planar elements firmly on said side surface and fastened perpendicularly to the base plate and including further supporting elements for said circuit cards.

4. An arrangement according to claim 3 wherein each of said planar elements includes a portion arranged parallel to an associated wall and fastened to said side surface and a connection part fastened to the base plate.

5. An arrangement according to claim 3 wherein said further supporting elements each comprises an upright pillar-formed portion projecting from the respective planar element, said upright portion having shelves on two opposite edge surfaces, said shelves having upper boundary surfaces constituting a supporting surface for a secured circuit card.

6. An arrangement according to claim 3 wherein said further supporting elements each comprises step-formed shelves arranged along an edge surface of said planar elements which is directed towards the front of the instrument, said shelves having upper boundary surfaces each forming a supporting surface for a secured card.

7. An arrangement according to claim 3 wherein said planar elements are adjacent a respective neighboring wall, each said planar element having two planar side surfaces perpendicular to said base plate, said further supporting elements being arranged on that side surface which is remote from the neighboring wall.

8. An arrangement according to claim 7 wherein said further supporting elements comprises ribs arranged in at least first and second rows in different planes, the position of the ribs in one plane being displaced relative to the position of the ribs in the other plane.

9. An arrangement according to claim 1 wherein said grooves in said projections are arranged in rows at different levels above said base plate.

* * * * *